United States Patent [19]

Fischer

[11] Patent Number: 5,136,643

[45] Date of Patent: *Aug. 4, 1992

[54] PUBLIC/KEY DATE-TIME NOTARY FACILITY

[76] Inventor: Addison M. Fischer, 60 14th Ave. South, Naples, Fla. 33942

[*] Notice: The portion of the term of this patent subsequent to Mar. 19, 2008 has been disclaimed.

[21] Appl. No.: 633,259

[22] Filed: Dec. 20, 1990

Related U.S. Application Data

[63] Continuation of Ser. No. 421,104, Oct. 13, 1989, Pat. No. 5,001,752.

[51] Int. Cl.$^5$ .............................................. H04K 1/00
[52] U.S. Cl. ....................................... 380/23; 380/30; 380/25
[58] Field of Search ....................... 380/23, 51, 52, 25, 380/30

[56] References Cited

U.S. PATENT DOCUMENTS

| | | | |
|---|---|---|---|
| 4,264,782 | 4/1981 | Konheim | 380/23 |
| 4,386,233 | 5/1983 | Smid et al. | 178/22.08 |
| 4,438,824 | 3/1984 | Mueller-Schloer | 178/22.08 |
| 4,458,109 | 7/1984 | Mueller-Schloer | 380/23 |
| 4,575,621 | 3/1986 | Dreifus | 380/23 |
| 4,625,076 | 11/1986 | Okamoto et al. | 178/22.11 |
| 4,633,036 | 12/1986 | Hellman et al. | 178/22.11 |
| 4,637,051 | 1/1987 | Clark | 380/51 |
| 4,710,955 | 12/1987 | Kauffman | 380/23 |
| 4,797,928 | 1/1989 | Dykes | 380/49 |
| 4,799,258 | 1/1989 | Davies | 380/23 |
| 4,837,822 | 6/1989 | Crosley et al. | 380/23 |
| 4,897,875 | 1/1990 | Pollard et al. | 380/23 |
| 5,001,752 | 3/1991 | Fischer | 380/23 |

Primary Examiner—Thomas H. Tarcza
Assistant Examiner—David Cain
Attorney, Agent, or Firm—Nixon & Vanderhye

[57] ABSTRACT

A time notarization apparatus and method is disclosed which uses a secure, microprocessor based hardware platform which performs public key cryptographic operations to obtain trusted time stamping with a minimum of intervention by third parties. The hardware platform is encapsulated in a secure fashion so that the device's timestamping mechanism may not be readily tampered with or altered. The hardware platform includes at least one digital clock and a stable, secure storage device to record the private half of a public/private key pair. Coupled to both the digital clock and the storage device is a data processing device which performs public key signature operations in a secure and tamper-proof manner. Only the processing device has access to the secure storage device and its associated private key. The hardware platform also includes input/output means which receives a digital message which is to be digitally signed and timestamped and which outputs the resulting timestamped signature generated by the device. The hardware platform also includes a power source, (e.g., on on-board battery) to ensure the accuracy of the device's digital clock and the security of storage data prior to installation or in case of a power failure.

12 Claims, 5 Drawing Sheets

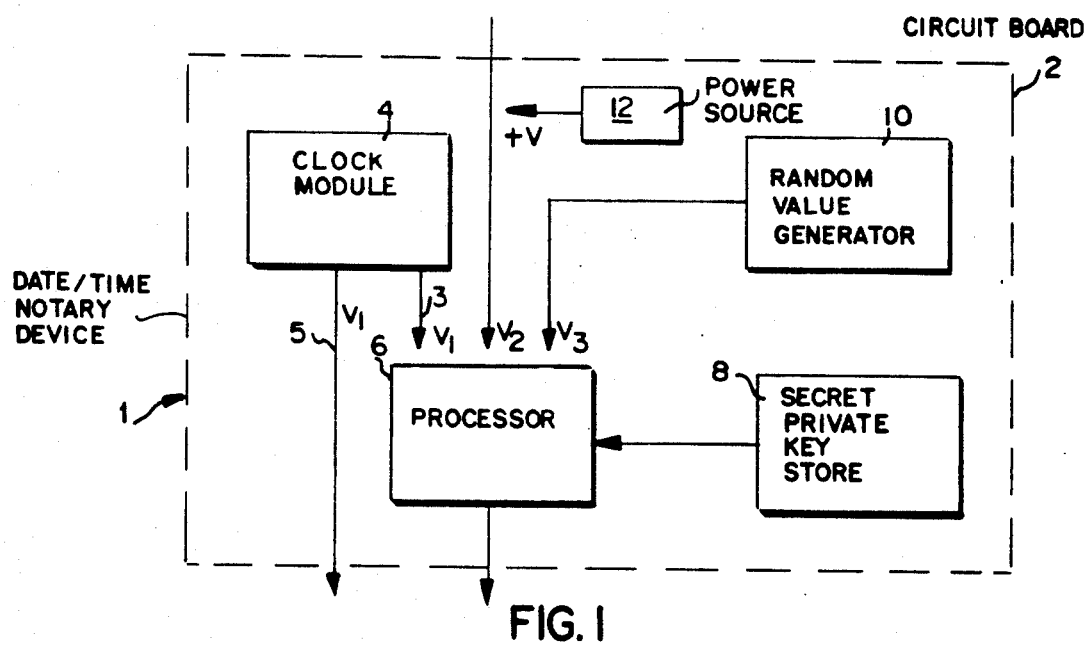
FIG. 1
FIG. 5
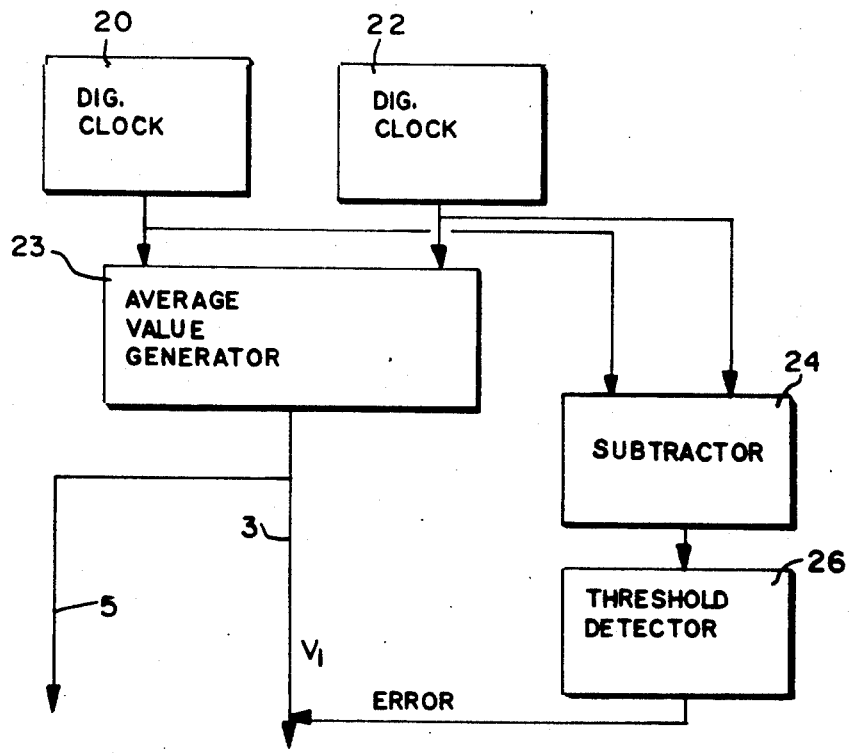

PUBLIC/KEY DATE-TIME NOTARY FACILITY

This is a continuation of application Ser. No. 07/421,104, filed Oct. 13, 1989, now U.S Pat. No. 5,001,752 issued Mar. 19, 1991.

FIELD OF THE INVENTION

This invention generally relates to an apparatus and method for digitally time stamping digital documents which are going to be electronically transferred. More particularly, the invention relates to a method and apparatus for serving as a public key date-time notary facility.

BACKGROUND AND SUMMARY OF THE INVENTION

The rapid growth of electronic mail systems, electronic fund transfer systems, electronic document transfer systems and the like has increased concerns over the security of the data transferred over unsecured communication channels. Cryptographic systems are widely used to ensure the privacy and authenticity of messages communicated over such unsecured channels.

Now that information and documents are being created, transferred and stored digitally, new requirements now exist for authentication and authorization of such information and documents.

Unlike paper media, digital originals are able to be readily altered. Furthermore, there is no prima facia method for estimating the age or authenticity of digital information—unlike physical written specimens where age and behavior of chemicals and handwriting provides some means for estimating authenticity and age.

The advent of public key algorithms now allow for a means of digital authentication. These systems range from basic signature systems, such as afforded by the straightforward use of, for example, the RSA Cryptosystem described by U.S. Pat. No. 4,450,829 to more complex authorization systems such as described by the applicant's U.S. Pat. No. 4,868,877, which allows for interlocking protection of coordinated signatures.

Typically in digital signatures, an individual's certification (his authorization to use his public key) is inherently bounded by an expiration date. There are many reasons for such a bound. One of these stems from the fact that in any such system there is a need to be able to receive and retain cancellation notices for public keys which have been (accidentally) exposed, or whose owners have been prematurely deprived of authorization. In general, such cancellation notices need to be kept by all parties at least until the certificate's prima facia expiration. If expiration dates were not specified, such notices would have to be retained forever.

If a culprit wishes to circumvent their expiration date, he might, in some cases, simply set back the clock in their computer and perform their signature at an apparently past time.

Also, there are many situations (especially now that an ever increasing amount of business is done electronically) where it is useful or sometimes critically important to ensure that the time and/or date associated with a particular event is in fact correct. For example, the date of an invention disclosure document can make the difference between an inventor securing a valuable proprietary interest in his invention or acquiring no such interest. In a business transaction, it may be important to ensure that the time reported as being associated with a contract or a purchase order is, in fact, correct. In either example, if it were possible for a user to create a back dated signature, the user could create a document which misrepresents itself chronologically.

One way to resolve this problem is to have all critical documents signed and time stamped by an impartial third party "digital notary" service. It may be difficult to find such a third party; or it may be difficult to obtain the services in a timely manner. For isolated users, such a digital notary might not be readily available. Moreover, this process may become error-prone, tedious, and a source of bottlenecks, while also creating potential security breaches.

The present invention is directed to an apparatus and method for performing a time notarization in a secure way, while eliminating the above-mentioned "digital notary" accessibility problems, thereby making such notarization easy for any individual or corporation to utilize. Moreover, the present invention performs the time notarization so as to make it easy for anyone to verify the notarization and to rely on the notarization time stamp. The apparatus is economical, and can be used locally without regard to using any external services.

The present invention provides a means whereby any digital information can be effectively notarized to have been in existence at the time explicitly stated in the notarization. This eliminates the possibility of electronic backdating through any subterfuge.

The time notarization apparatus and method of the present invention uses a secure, microprocessor based hardware platform which performs public key cryptographic operations to obtain trusted time stamping with a minimum of intervention by third parties. The hardware platform is encapsulated in a secure fashion so that the device's timestamping mechanism may not be feasibly subverted with or altered.

The hardware platform includes at least one digital clock and a stable, secure storage device to record the private half of a public/private key pair. Coupled to both the digital clock and the storage device is a data processing device which performs public key signature operations in a secure and tamper-proof manner. Only the processing device has access to the secure storage device and its associated private key.

The hardware platform also includes input/output means which receives a digital message which is to be digitally signed and timestamped. The input/output means may return the resulting timestamped signature generated by the device to the presenter of the document or store the digital timestamp or dispose of it in any other appropriate means. The hardware platform also includes a power source, (e.g., an on-board battery) to ensure the accuracy of the device's digital clock and the security of stored data continuously during all times during device's useful life.

BRIEF DESCRIPTION OF THE DRAWINGS

These as well as other objects and advantages of this invention will be better appreciated by reading the following detailed description of the presently preferred exemplary embodiments taken in conjunction with the accompanying drawings of which:

FIG. 1 is a block diagram of a public key date/time notary device in accordance with an exemplary embodiment of the present invention;

FIG. 5 is a block diagram showing an exemplary digital clock module; and

DETAILED DESCRIPTION OF THE DRAWINGS

Figure 2:
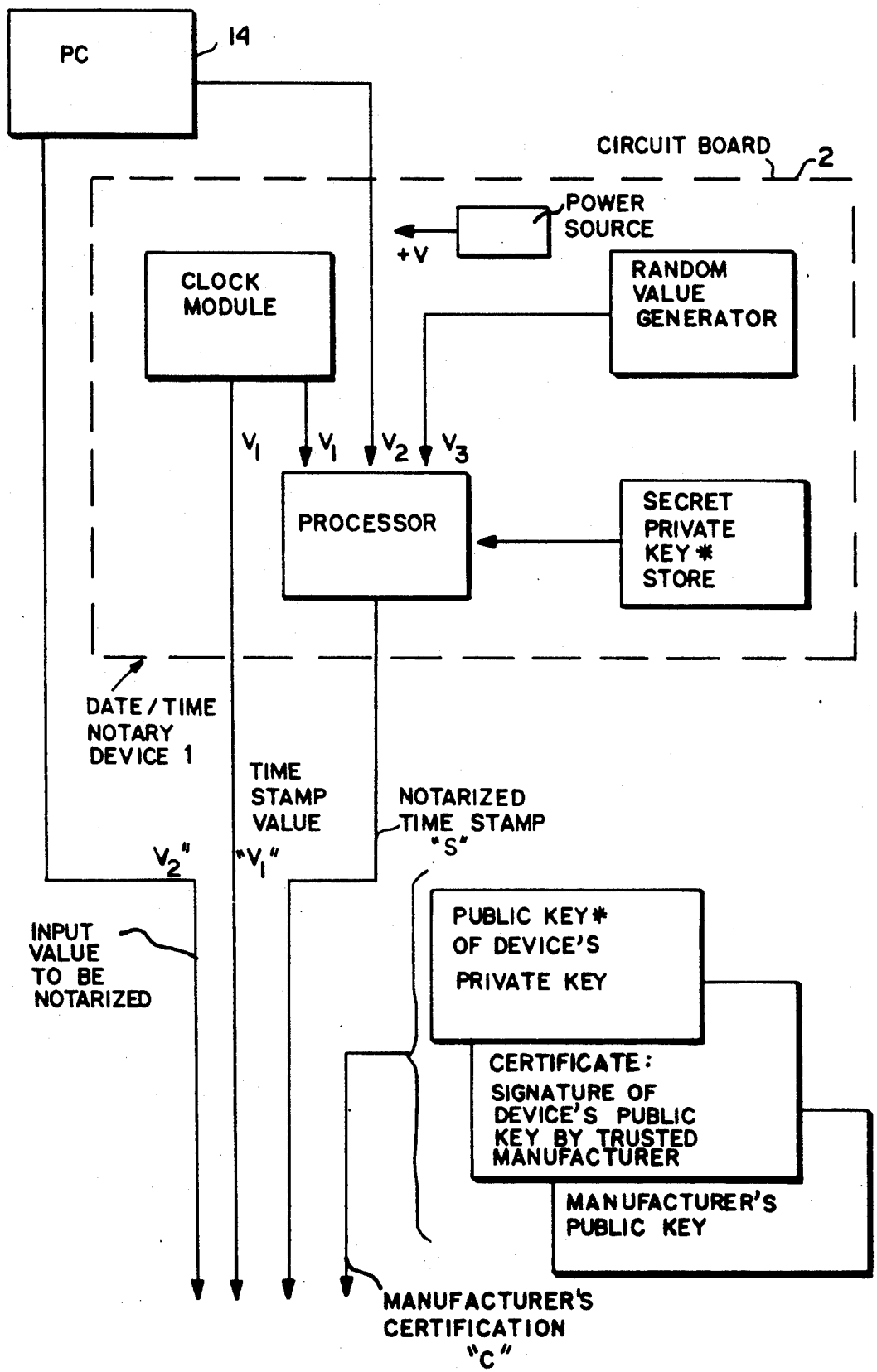
FIG. 2 is a block diagram showing the device of FIG. 1 in conjunction with a document input and various outputs which indicates how the time stamp is created.

FIG. 1 is a block diagram of a date/time notary device 1 in accordance with an exemplary embodiment of the present invention. Stated briefly, the device 1 includes a clock module 4, which is coupled to processor 6. Processor 6 is also coupled to a storage device 8 and a random number generator 10. Each of these components and an on-board power source 12 are mounted on a printed circuit or computer board 2. The circuit board 2 and the components mounted thereon are packaged in a secure fashion so that the contents of storage device 8 cannot be externally accessed or observed and so that the digital clock (or clocks) in clock module 4 cannot be readily tampered with or altered.

One approach that may be utilized to render the device 1 effectively tamper-proof is to dispose epoxy over the components on the circuit board so that the component pins cannot be probed or tampered with without destruction. The components themselves may be designed to be sensitive to physical tampering so that, for example, numeric values associated with the general registers in processor 6 are modified in response to physical tampering. In this regard, processor 6 may have one or more of its input pins coupled to switches (not shown) embedded in the epoxy which encases it. Such a switch will close (or open) in response to tampering and, for example, generate a distinctive signal level on a processor input pin. Processor 6 may then, for example, respond to the change of state of such an input pin to, in turn, modify or erase a predetermined value, including erasing the private key value stored in a processor register or to branch to an error routine to thereby prevent the public key date/time notary device from operating properly, or having the private key value discovered.

Focussing in more detail on FIG. 1, as indicated above, embedded in date/time notary device 1 is a clock module 4. Clock module 4 may, for example, contain a commercially available digital clock such as for example, Model No. MM5827BN Clock module 4 generates a time stamp value V1 on its output lines 3 and 5. The time stamp value V1 may be the output of, as described above, a single digital clock. Alternatively, the value V1 may be an average of the outputs of two or more digital clocks. It also generates an error signal (not shown) when the clocks appear to fail.

FIG. 5 shows a block diagram of an exemplary clock module having multiple digital clocks, e.g., 20, 22. The outputs of the digital clocks 20 and 22 are coupled to an average value generating circuit 23 which averages the time stamp signals of clocks 20 and 22 and outputs the average time on output lines 3 and 5 as the clock module time stamp value V1.

The outputs of digital clocks 20 and 22 are coupled to, for example, a subtractor 24 which generates a signal indicative of the difference between the digital output of clocks 20 and 22. The difference between the outputs of clocks 20 and 22 is then coupled to threshold detector 26. If, and only if, the difference between the clock signals exceeds a predetermined threshold, e.g., corresponding to a difference of greater than several milliseconds per day, threshold detector 26 generates an error signal, which is coupled via output line 3 to processor module 6. Processor module 6 decodes the error signal and enters an error routine which disables device 1 and erases the private key.

The use of multiple digital clocks 20 and 22 is desirable since the date/time notary device 1 is being relied on to generate an accurate time stamp. Since it is possible that a single digital clock may (over time) begin to operate in a defective manner, the use of two (or more) digital clocks coupled, as described above, to a threshold detector substantially enhances the likelihood that the clock module will generate an accurate time stamp. Additionally, the use of multiple digital clocks provides a mechanism for detecting that some party is tampering with the clock module. In this regard, if the outputs of one of the digital clocks is disturbed, through the use of the threshold detector 26, an error signal will likely be generated and the device 1 will be thereafter disabled. The Subtractor, although shown in the "clock" module, may actually be performed by the Processor (6). The checking could be performed only when a document is presented, or preferably, could be done continuously.

Turning back to FIG. 1, processor module 6 may, for example, be a commercially available microprocessor such as an Intel-286 microprocessor. The processor 6 may be any microprocessor which has sufficient independent computing power to perform or coordinate public signature operations in a secure and tamper proof manner.

Coupled to processor module 6 is storage device 8 in which a secret private key of a public/private key pair is stored. It is important that the contents of storage device 8 be only accessible to processor module 6. Storage device 8 must be a stable, secure storage device such that users will be unable to determine the contents of the storage device i.e., the private key. Storage device 8 is preferably a read only memory (ROM) which may also operate as a program memory for processor module 6. Storage device 8 may be embodied in processor module 6. Any detection of attempted tampering should cause this value to be destroyed.

Date/time notary device notary 1 also includes a power source 12, which may be an on-board battery having a relatively long life, which supplies power to the components shown in FIG. 1, if the device 1 is operating in a stand alone fashion and when the device is not installed (e.g., during shipping). Alternatively, as will be explained further below, if the device 1 is operating in conjunction with, for example, an associated computer system, then the device 1 may be externally powered and power source 12 would serve as a battery back-up in case of a power failure. It also must serve to keep the system "alive" between when it is initialized (at the factory) and the time the user plugs in to an external power source.

The exemplary date/time notary device 1 also includes a random value generator 10 which is coupled to processor module 6. Random value generator 10 introduces a random value V3 which is utilized in the public key signature operation by processor module 6. Random value generator 10, introduces yet a further degree of cryptographic strength to the public key signature process by introducing a random input which is operated on. By including this random value in each signature, special values, which might give an opponent some unforeseen advantage in cracking the signature system, cannot be supplied by an opponent. Random value generator 10 may, for example, be comprised of a noise diode which generates unpredictable outputs that are used to generate a random number V3. Such random value generators are commercially available and may, for example, comprise Model No. 1N751. Random value 10 generator may alternatively be implemented by, for example, a subroutine executed by processor module 6 which utilizes any reasonable random value or pseudo-random value generating algorithms (of which there are many which are known) to generate values V3. The random generator is actually optional and only serves to increase the theoretical strength of the algorithm.

Prior to describing the manner in which the date-time notary device 1 operates, the device input, output and the system in which the device 1 will typically operate will be described in conjunction with FIG. 2. Device 1 is contemplated to be typically coupled to a processing system 14 which may, for example, be an IBM-PC or the like. The circuit board 2 is physically inserted into the PC so as to be coupled to one of the PC ports. In this regard, the circuit board 2 would be coupled to a PC port in the same fashion as, for example, a display interface card. The processing system 14 may, in turn, be coupled to a telecommunications system via, for example, a telephone link so that it is able to receive digitally transmitted files, messages, or documents.

The PC, for example, upon receiving an electronic document to be signed inputs a digital bit stream V2 to be notarized via its output line 15. Thereafter, a notarization proof set packet including a notarized time stamp is returned to the party originally transmitting the electronic document to be signed. Processing system 14, of course, need not be a PC, but rather may be a larger mainframe computer, a network of devices comprising a telecommunication system, etc.

The input value V2 to be signed and time notarized may be any digital value, including, for example, a digital document which may in actuality represent a purchase order, a contract, an authorization to perform a particular act on behalf of the originator of the document, or any other type of document where it is important to prove that the document existed as of a predetermined time. The date/time notary device 1 generates a notarized time stamp which may be utilized to prove that the document was not created at a point in time after the time indicated on the document. The input V2 may also itself be a user's digital signature of yet another digital value. The device may also create a hash of the input V2, and embed the hash in the signature rather than the entire input V2.

In an exemplary embodiment of the present invention, the notarization proof set packet includes four values which are returned to the party transmitting the original digital document to be date/time notarized. In this regard, as shown in FIG. 2, the digital document or input value to be notarized, V2, is returned to the document originator. Additionally, the time stamp value V1, which is the time output of the clock module 4 is returned to the document originator and a notarized time stamp S is also returned. The time stamp value V1 reflects the most accurate time which clock module 4 is capable of generating. Time stamp value V1, as previously explained will only be generated if the multiple clocks in module 4 are within a predetermined threshold of being in complete synchronization. It is noted that the output of each of the digital clocks in clock module 4 could each be transmitted if desired. In some cases, with some signature systems, including RSA, it might be possible t only retain the "S" value, since the V1 value can be extracted therefrom. On the other hand, it may be necessary to retain V3 as well as V1.

Figure 6:
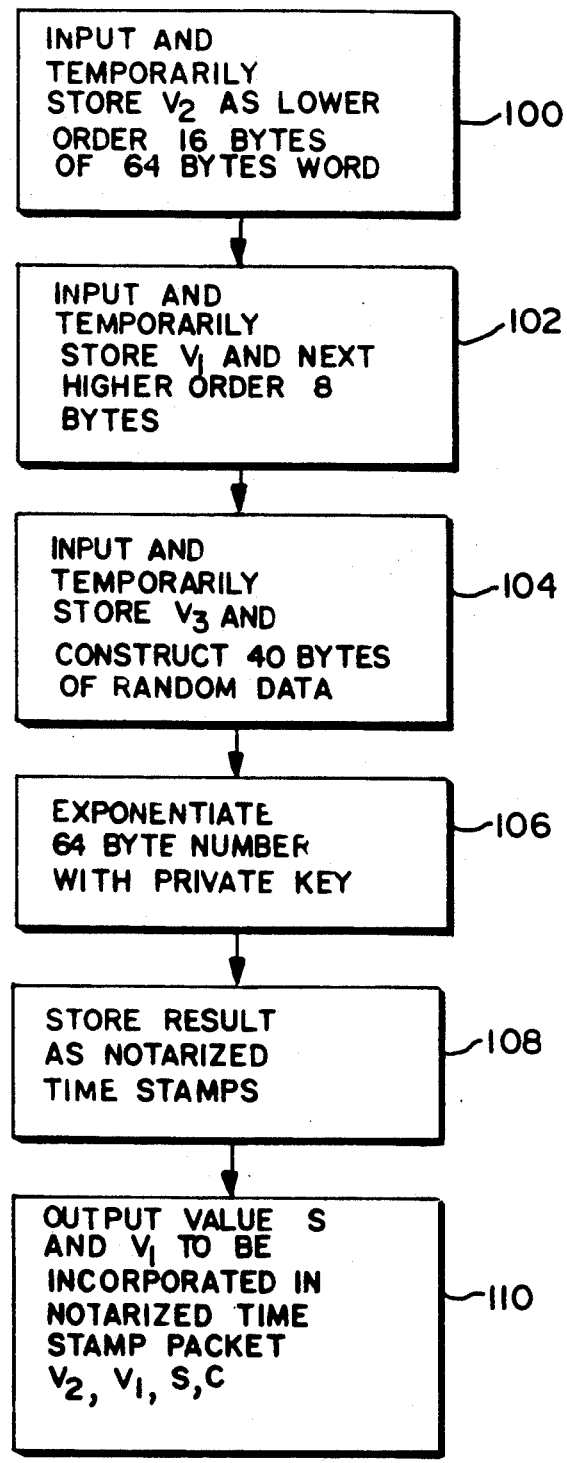
FIG. 6 is a flowchart generally showing the sequence of operations performed by the device in FIG. 1 in performing the public key signature operation.

The general sequence of operations performed by processor 6 is shown in the flowchart of FIG. 6. In brief, the processor 6 inputs and temporarily stores each of the values V1, V2, and V3 and the secret key residing in storage device 8 in, for example, its working RAM (not shown). The processor 6 obtains the input value V2, which is the document to be notarized, via receiving input line 15 and combines this value with the time stamp V1 received via line 3 and the random value generated by module 10 using a public/key cryptographic signature operation. In this regard, the combination of values V1, V2 and V3 are processed by module 6 using the secret private key stored in storage device 8. The signature process may, for example, be performed using the RSA digital signature technique taught in U.S. Pat. No. 4,405,829.

By way of example only, as shown in FIG. 6, assuming a 512 bit (64 byte) RSA signature is utilized, V2 is input and it (or its hash) is temporarily stored as the lower order 16 bytes of the 64 bytes of data which represent the input document which is to be notarized V2 (100). There are many well known hashing schemes which can be used in conjunction with signature systems. Another eight bytes of the 64 byte value is utilized to store V1 the output of the clock module 4 which is input via line 3 and temporarily stored (102). The remaining 40 bytes in the value may consist of random bits which are constructed from the input received from the random number generator 10 (104). This 64 byte number is then exponentiated with, for example, a RSA private key stored in storage device in accordance with the teachings of U.S. Pat. No. 4,405,829 (106). This yields the digital signature. After processing the 64 bytes of data with the stored private key, an output signature value is stored (108) and output (110) which is identified in FIG. 2 as being the notarized time stamp S. There are may ways in which the input V2 and the time stamp could be combined in preparation for signing.

The final value which is included in the notarized time stamp proof set (V2, V1, S, C), which is transmitted to the party whose document is being date/time notarized, is the manufacturer's certification C. Turning back to FIG. 2, the manufacturer referred to therein is the manufacturer of the date/time notary device 1. The manufacturer's certification C will have embodied within it the public key 16 which is associated with the device's private key as well as the manufacturer's public key 17 and will include the digital signature of the device's public key by the trusted manufacturer.

Further details regarding the nature of a potentially multi-level digital certificate and an exemplary digital certificate is found in the applicant's U.S. Pat. No. 4,868,877, which issued Sep. 19, 1989 and is entitled "Public Key/Signature Cryptosystem with Enhanced Digital Certification", which is incorporated by reference herein. As described in detail in the applicant's patent, the device's public key may, if desired, be certified in such a way as to identify the authority of its creator. The certification process involves signing this new public key with a private key of the trusted manufacturer and if desired, expressly indicating the authority which has been granted by the signor (i.e., authorization to be a trusted time-notary). Such trust may be implicit simply because of the manufacturer's well recognized public key which is used for the signature. In this regard, the trusted authority (i.e., the manufacturer) is contemplated as having a well-publicized public key, which is known and accepted by all potential users of the device. Such a manufacturer may simply use its private key portion to sign the device's newly created public key. Alternatively as described in the applicant's patent, the delegated authority as a trusted time-notary might be controlled by a hierarchy of certificates or the manufacturer's signature might indicate co-signing necessary by one or more other witnesses to reduce the risk of corruption by a single manufacturer's representative or by any single party. In such a case, the device's certification will need to include information regarding all of these signatures. Alternatively, U.S. Pat. No. 4,405,829 could be applied directly to yield a simple, one-level certificate which would be validated simply through widespread acceptance and knowledge of the manufacturer's public key.

In practice, the end user receives the device 1 together with a copy (on a floppy disk) of the public key corresponding to the secret private key embedded in the device, the manufacturers' certification of this public key and a program which can be used to feed any input to the device 1 and deliver corresponding output from the device.

The time stamped notarized signature S (together with items V1, V2 and C) then serves as a notarized record showing that whatever object that was signed did exist at the specified moment (and was in the proximity of a particular signing device Generally, the device's output signature and time stamp value V1 would be typically accompanied by the device's associated public key and the manufacturer's certification of the device's public key, and the manufacturer's public key(s), so that all of these together act as a proof set for the notarization. The notarized time stamp may then be transmitted and/or stored with the object for later proof that the object existed at the specified moment. It is noted that, in a special case, when the object being notarized is actually itself a digital signature by some other party of some third object (e.g., a document, purchase order, etc.), the notarization of such a signature essentially vouches that the signing party did, in fact, create said signature on or before the specified time. This provides a very clear analog to the standard functions performed by a conventional notary public service.

Figure 3:
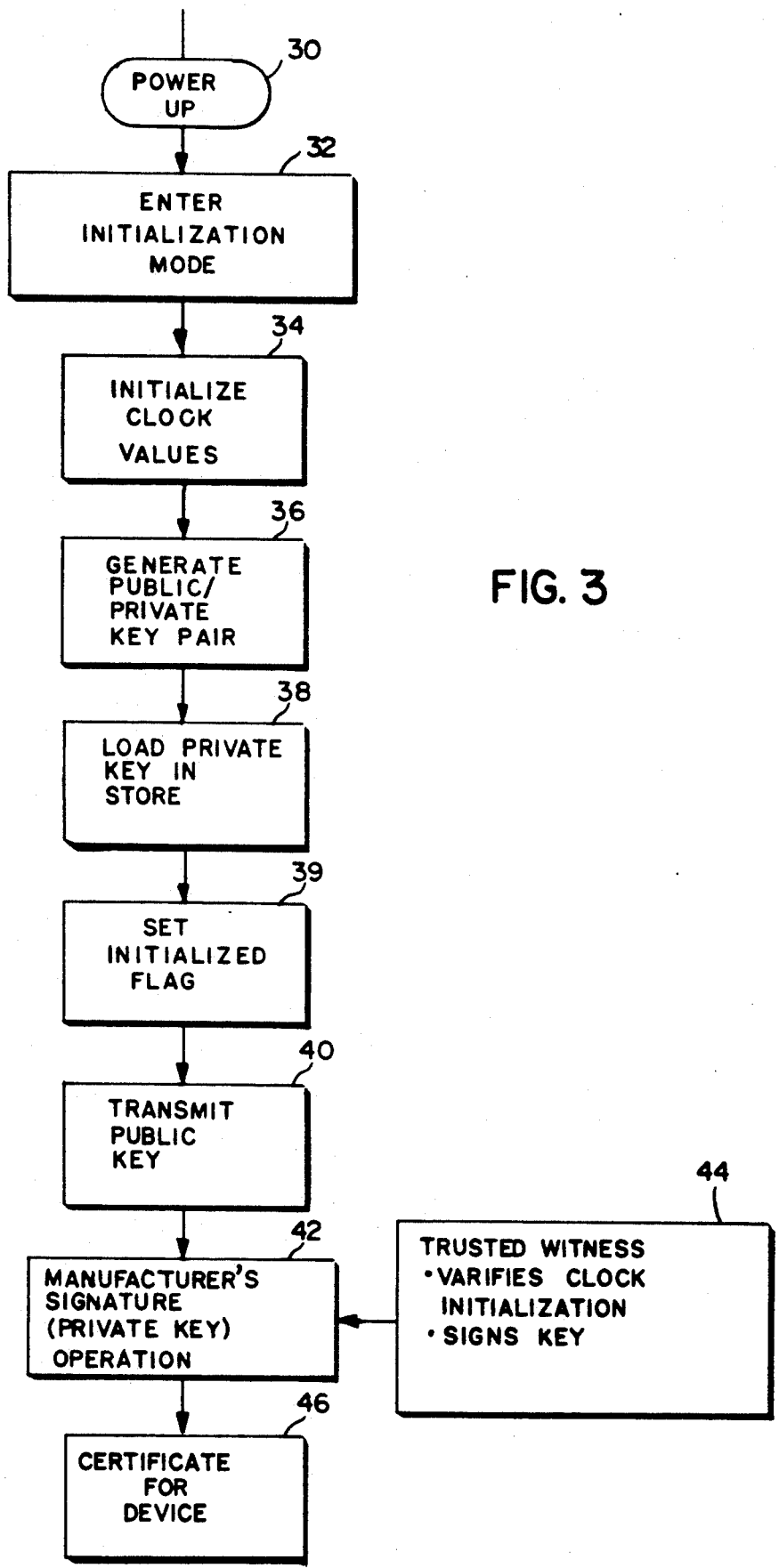
FIG. 3 is a flow diagram showing an exemplary method for loading and initializing the device of FIG. 1.

The manner in which the device 1 is loaded is exemplified by the flowchart shown in FIG. 3. It is contemplated that the device 1 will be initially loaded during the manufacturing process. The loading may occur by coupling the device 1 via its input port 15 (see FIG. 2) to a loading processor (not shown) at the manufacturing plant.

As indicated by the flowchart shown in FIG. 3, the device 1 upon being powered on (30) immediately branches to an initialization mode routine (32). In the initialization mode, the device 1 enters a loading state in which the clock module 4 is initially set (32). Clock module 4 is set based on a universally recognized standard time to accurately initialize the digital clocks and initiate them to begin operation. Thereafter, the processor module 6 internally generates a public key/private key pair using random values which ar generated by the processor 6 (or are received from the manufacturer during the device's initialization) in a manner consistent with any public key signature method, such as e.g., described in the teachings of the RSA public key cryptography (see U.S. Pat. No. 4,405,829 or 4,868,877) (36). Thereafter, the private key portion is loaded into storage device 8 (38). After the private key portion has been stored, an "initialized flag" is set (39) indicating that the device initialization has been completed which insures that the processor 6 cannot be initialized again.

As indicated in step 40, the processor module 6 then transmits the public key which it generated in step 36 to the initializing processor device. It is noted, however, that the private key portion of the public/private key pair is not transmitted to the initializing processor so even the initializing processor is not aware of the secret private key. Thereafter, a digital signature operation is performed on the transmitted public key (42) using the private key of a trusted authority, e.g., the manufacturer. The initializing processor may perform the signature operation (42) to generate a digital signature for the device 1. Thus, the manufacturer signs the generated device public key and in so doing verifies, by creating a digital certificate for the device (which may be stored in the device itself or on a floppy disk separate from the device), that the time/data notary device 5 is bonafide and trustworthy. In this regard, the signature process indicates that the signing party has verified that the clocks were initialized to the correct time (44). Furthermore, associated with the certificate for the device is the manufacturer's public key which will be utilized by the party receiving the date time notarized document to assure that the date/time stamp is authentic.

If desired, rather than the public/private key pair being generated by the processor module 6, the public/private key pair may be generated by the initialization processor. In this fashion, the processor module 6 need not have the capability of generating its own public/private key pair, thereby saving on program storage. Thus, an alternative method for initializing device 1 is to initialize the clock values that are used such as in step 34 shown in FIG. 3, but rather than having the processor module 6 generate the public/private key pair, such a pair would be loaded by the initialization processor. The initialization processor would then erase its copy of the private part of the key pair immediately after it is generated. Thereafter, the initialization process would proceed as previously described in conjunction with FIG. 3.

Figure 4:
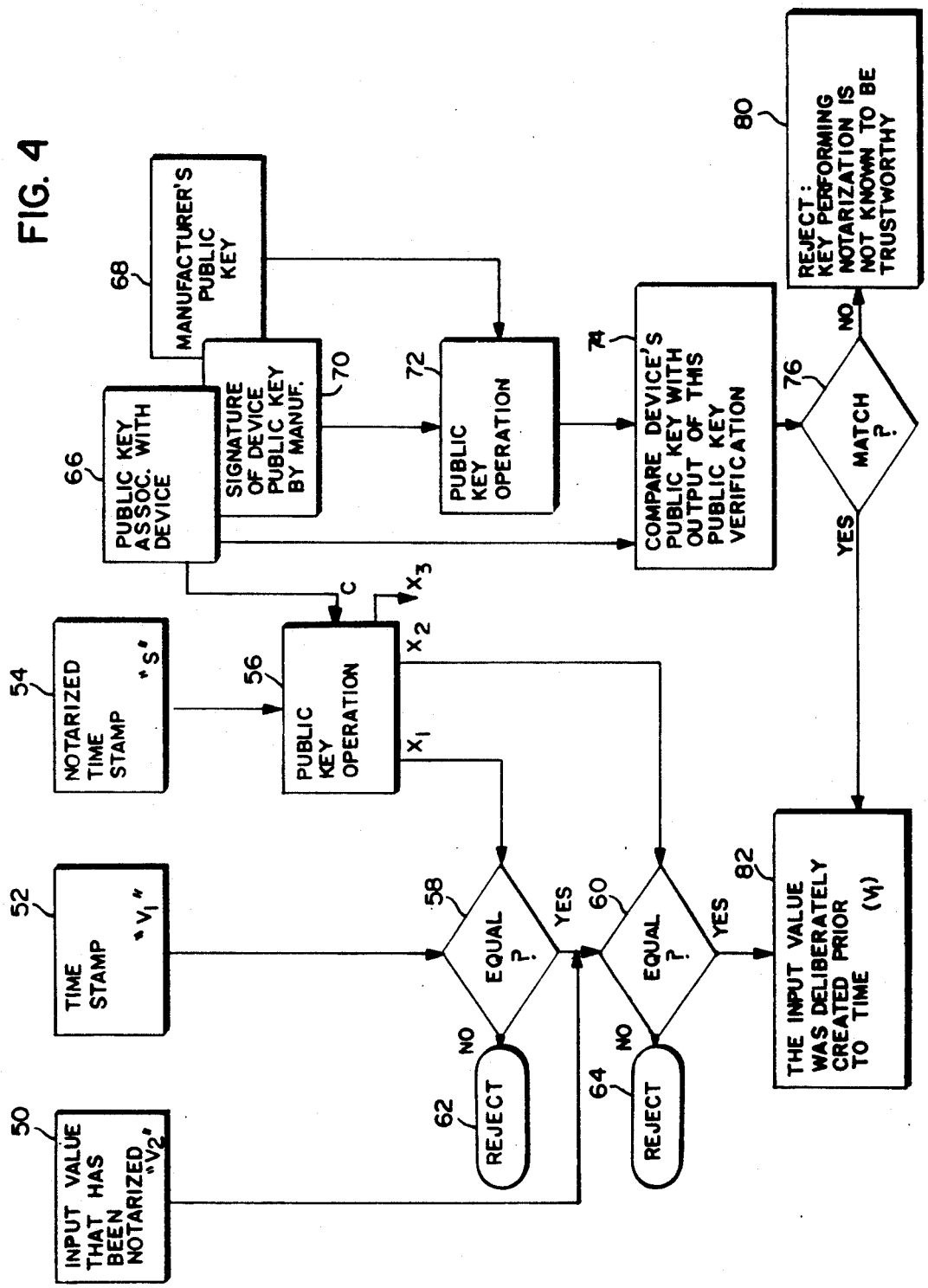
FIG. 4 is a flow diagram showing how the time stamp is verified.

The recipient of a date/time notarized document, after electronically receiving and storing the document would then verify the time stamp in accordance with the flowchart shown in FIG. 4. By so verifying the time stamp, the user can prove that the document was created no later than the date and time indicated. The digital time stamp on the received document includes an input value that has been notarized V2 (50), a time stamp V1 (52), a notarized time stamp S (54) and a manufacturer's certification C (66, 68, 70). It is noted that the notarized time stamp S (54) has embedded within it the values V1, V2, and V3 as described above in conjunction with FIGS. 2 and 6. The manufacturer's certificate C and the notarized time stamp S are processed via a public key operation (56) thereby resulting a 16-byte value X2, an 8-byte value X1 and a 40 byte random value X3. The values X1, X2, and X3 should be equal to values V1, V2, and V3 (which have been described above in conjunction with FIG. 2) if the time stamp was properly notarized. The exact steps shown for verifying the various values are suitable for the RSA algorithm. Another sequence of steps may be necessary for other public key algorithms. It should be noted that some public key systems would also need to know the "random" value V3.

X1 is then compared with V1 as indicated at block 58 and if the results are not equal, then the time stamp must be rejected. If the results of X1 is equal to V1 as determined at block 58, then a comparison is made in block 60 between X2 and the input value that has been notarized V2 and if the results are not equal the time stamp is rejected (64).

If the results of the comparison in block 60 indicate that X2 equal V2, then one of the criteria is met for determining that the input value has been deliberately created prior to the time indicated by V1 (82). It is noted that the random value X3 could be compared with the generated random value V3, if desired, but for purposes of simplicity, such a comparison is not shown in FIG. 4.

A check of the device's public key is also made in FIG. 4. In this regard, from the manufacturer's certificate, the signature of the device's public key, which has been made by the manufacturer (70) and the manufacturer's trusted public key (68) are processed via a public key operation (72). The output of the public key operation should validate the public key associated with the device (66). A comparison is made which compares the device's public key with the output of the public key operation (74). If there is not a match as indicated at block 74, then the time stamp is rejected because the public key that performed the notarization is not known to be trustworthy (80). If the check at blocks 74 and 76 indicate that there is a match, then it is verified that the public key did belong to a device created by the manufacturer. Given the confirmation that the device was created by the manufacturer and that the time stamp was created by the device's public key, then the user can accept that the document was created prior to the time/date indicated by time stamp V1 (82).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digital time notarization device for enabling a user to digitally notarize digital information without regard to any particular recipient of said digital information comprising:
   a clock module for generating clock signals indicative of time;
   input means for receiving a digital input value to be notarized;
   a digital storage device, said storage device storing a private key associated with the notarization device, said private key having a corresponding device public key; and
   a digital processor device for performing a digital signature operation on said clock signals and said digital input value using said private key corresponding to the device public key for generating a notarization time stamp, whereby a holder of said device public key may verify that said notarized time stamp is authentic.

2. A device according to claim 1, further comprising random number generator means, coupled to said processor device for generating a relatively unpredictable output value, said processor device creating said notarized time stamp using said unpredictable output value.

3. A device according to claim 1, wherein said clock module includes a plurality of digital clocks.

4. A device according to claim 3, further including averaging means coupled to receive the outputs of said plurality of digital clocks for generating a time output signal which is the average of the outputs of said plurality of digital clocks.

5. A device according to claim 3, further including threshold detecting means for generating an error signal if the difference between the outputs of said plurality of clocks exceeds a predetermined threshold.

6. A device according to claim 1, wherein said input value represents at least one digital message.

7. A device according to claim 1, wherein said digital input value is a hash value.

8. A method of digitally time notarizing a digital message comprising the steps of:
   receiving a digital message to be date/time notarized by a digital notarization device;
   generating clock signals indicative of time within said device;
   accessing a private key created for said device and stored in a tamper proof storage device in said notarization device, said private key having a corresponding device public key;
   performing a digital signature operation on said digital message, and said clock signals, using said private key, whereby a notarized time stamp is generated by said notarization device; and
   generating a digital time stamp notarization packet including said notarized time stamp and digital data identifying said device public key.

9. A method according to claim 8, wherein said device public key is certified by a trusted authority and wherein said notarization packet includes at least a notarized time stamp and a digital certificate by the trusted authority certifying the device's public key.

10. A method according to claim 8, further including the steps of:
    generating a relatively unpredictable value, and
    crating said notarized time stamp using said unpredictable value.

11. A method according to claim 8, wherein said receiving step includes the step of receiving said digital message from a data processing system.

12. A method according to claim 8, further including the steps of initializing said notarization device; and
    storing an indication in said notarization device that the initialization has been completed.

* * * * *